May 10, 1927.

E. S. BIRD ET AL 1,628,598

LATHE

Filed Dec. 2. 1924

Inventors
Edward Stockton Bird
Francis B. Cockburn

By Wood & Wood
Attorneys

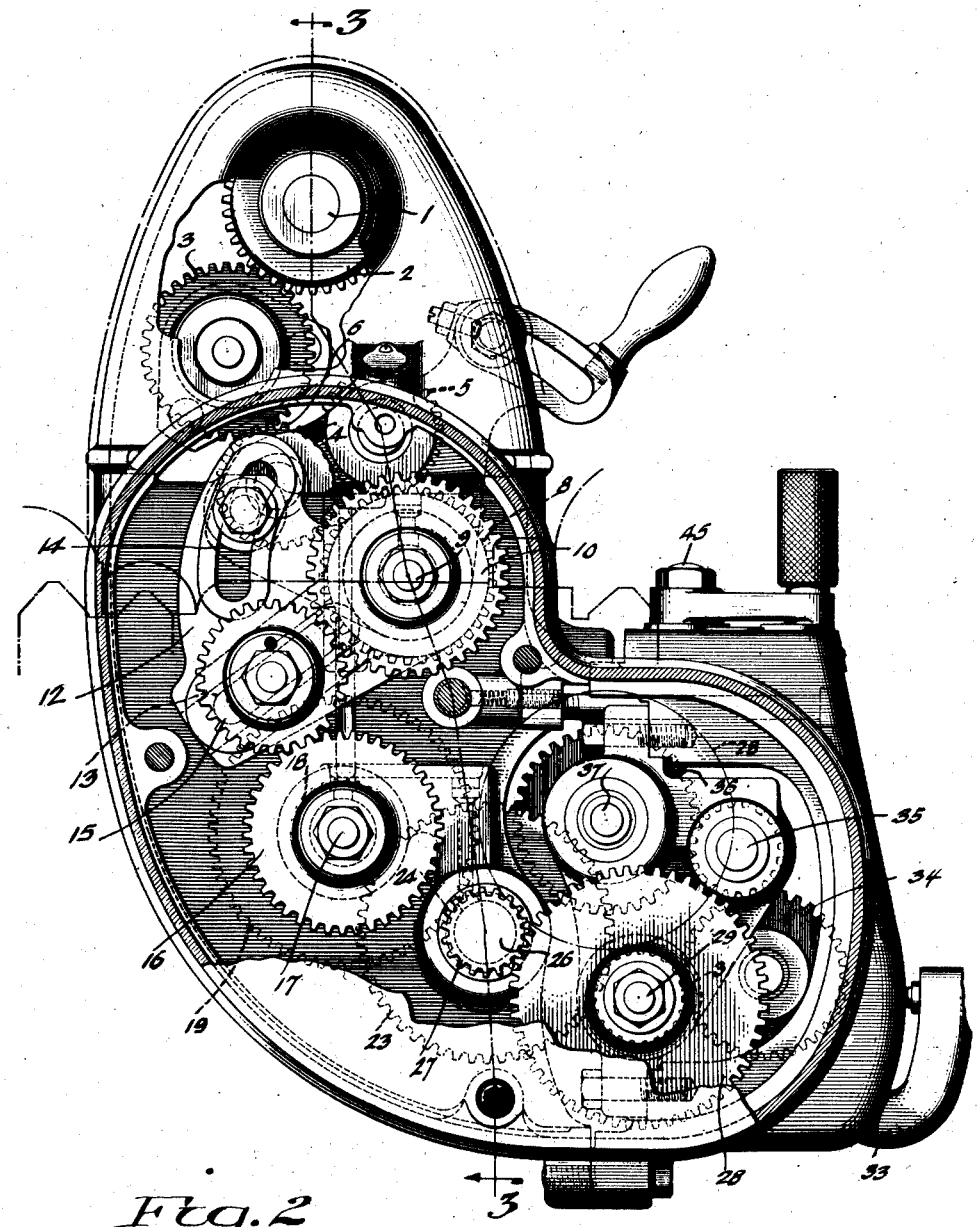

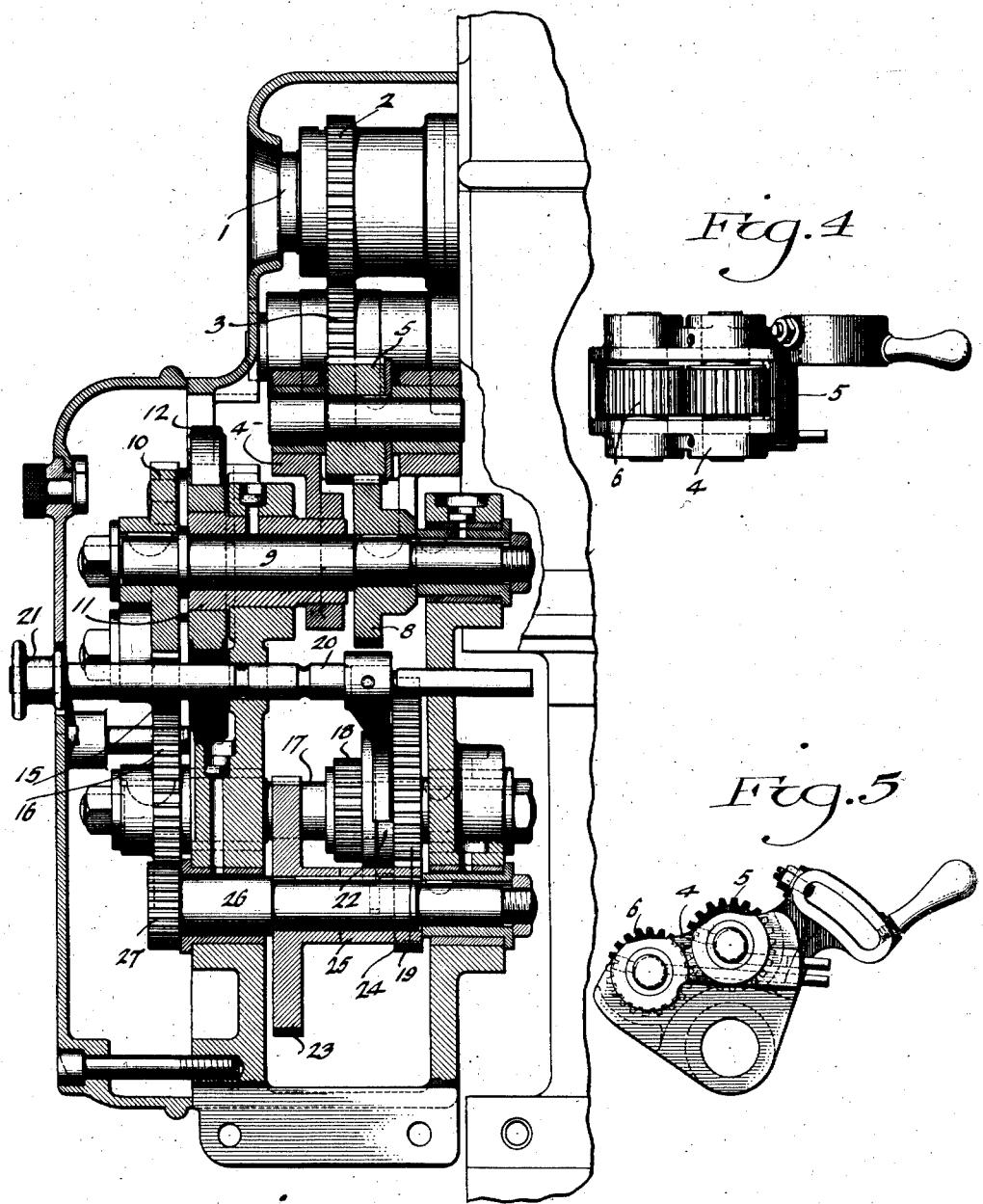

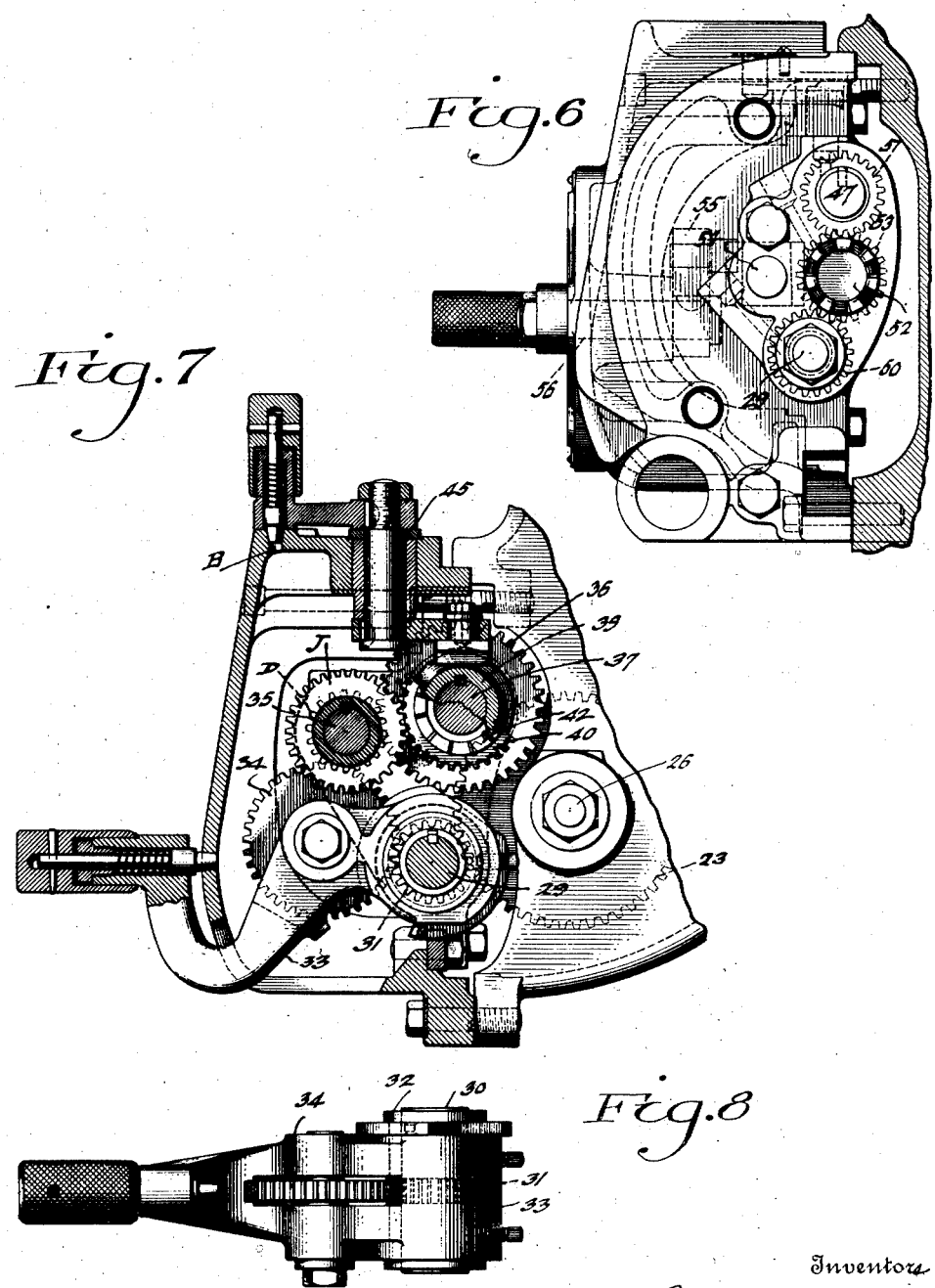

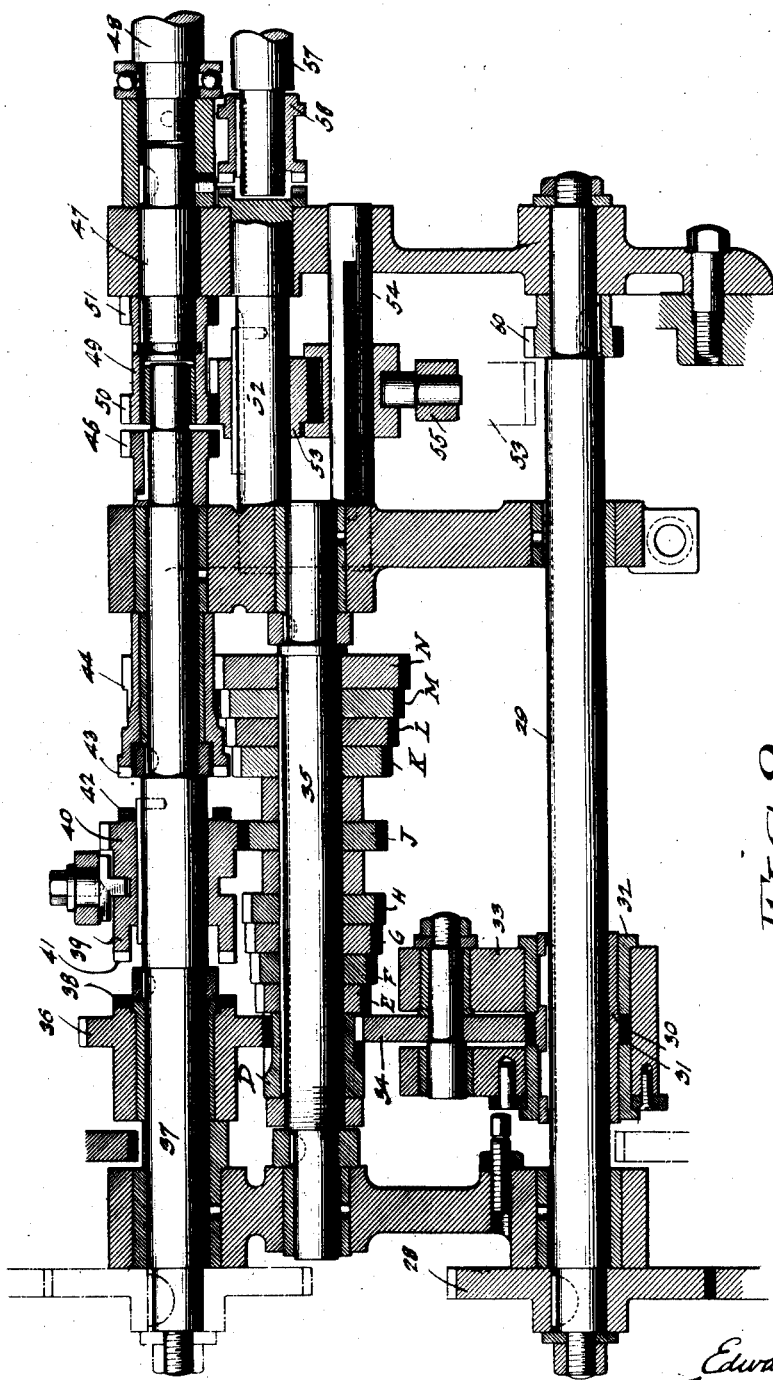

Patented May 10, 1927.

1,628,598

UNITED STATES PATENT OFFICE.

EDWARD STOCKTON BIRD AND FRANCIS B. COCKBURN, OF CINCINNATI, OHIO, ASSIGNORS TO THE LODGE & SHIPLEY MACHINE TOOL COMPANY, OF CINCINNATI, OHIO, A CORPORATION OF OHIO.

LATHE.

Application filed December 2, 1924. Serial No. 753,514.

This invention relates generally to feed gearing but is, however, particularly adapted for lathes of a type wherein the various pitches for thread cutting are obtained through selective engagement of the different gears of a "cone," these gears being ordinarily driven from the spindle and being suitably transmittably connected with the lead screw and feed rod. Although the invention as herein shown is applied to this particular design of lathe, the principles can be applied as well to other analogous mechanisms.

The object of the invention is to provide means, in a machine of the above mentioned character wherein the "cone" gears, on an intermediate shaft are made to act as driving members in one instance and as driven members in the other, this object being accomplished herein by providing two driven shafts each transmittably connectable with the gears of the "cone," the axes of these shafts being equidistant from the axis of the driving shaft, so that a single change gear only is used for alternately and selectively transmitting either of the driven shafts, the driving shaft being thus transmittably connected with the other shafts. The driving shaft may either be the lathe spindle or a shaft in transmission connection with said spindle, through the ordinary "translating" change gears used for converting U. S. standard into metric leads, or vice versa.

Another object of the invention is to provide means for selectively imparting variable rates of speed to lead screw and feed rod, either to one or both as desired, this object being accomplished through the driven shafts above mentioned, each of which has a single gear thereon transmittingly connected with gears carried by the lead screw and feed rod, whereby either of the driven shafts are adapted to drive either or both lead screw and feed rod.

Another object of the invention is to provide mechanism associated with the headstock gearing whereby the lead screw and feed rod may be operated simultaneously or separately and whereby the lead screw may be operated for cutting threads conformably to U. S. standard or metric standards, the construction being applicable to lathes equipped for cutting U. S. standard or metric leads.

Another object of the invention is to provide means whereby an equal and full number of changes available for cutting U. S. standard threads are also available for cutting metric threads, without the use of other change gears than those ordinarily used as "translating" gears, which latter gears are required for converting the inch system of thread cutting into the millimeter system.

Another object is the provision of means whereby a plurality of driven shafts, which are adapted to be alternately and selectively driven from the gears of a "cone," are also adapted to be transmittably connected with either or both lead screw and feed rod associated therewith, whereby lead screw and feed rod may be simultaneously driven, or either separately driven and whereby either of the driven shafts is adapted to drive either or both lead screw and feed rod.

Figure 2 is a vertical section substantially on line 2—2 of Figure 1.

Figure 3 is a vertical section approximately on line 3—3 of Figure 2.

Figure 4 is a plan view of the reversing plate.

Figure 5 is a side elevation of the structure of Figure 4.

Figure 6 is an end elevation showing the arrangement of the lead screw and feed rod operating shafts.

Figure 7 is a fragmentary vertical section approximately on line 7—7 of Figure 1, illustrating the tumbler construction.

Figure 8 is a plan view of the tumbler.

Figure 9 is a diagrammatic longitudinal sectional view illustrating the relations of the cone gear shaft to lead screw and feed rod operating shafts associated therewith.

Figure 1:
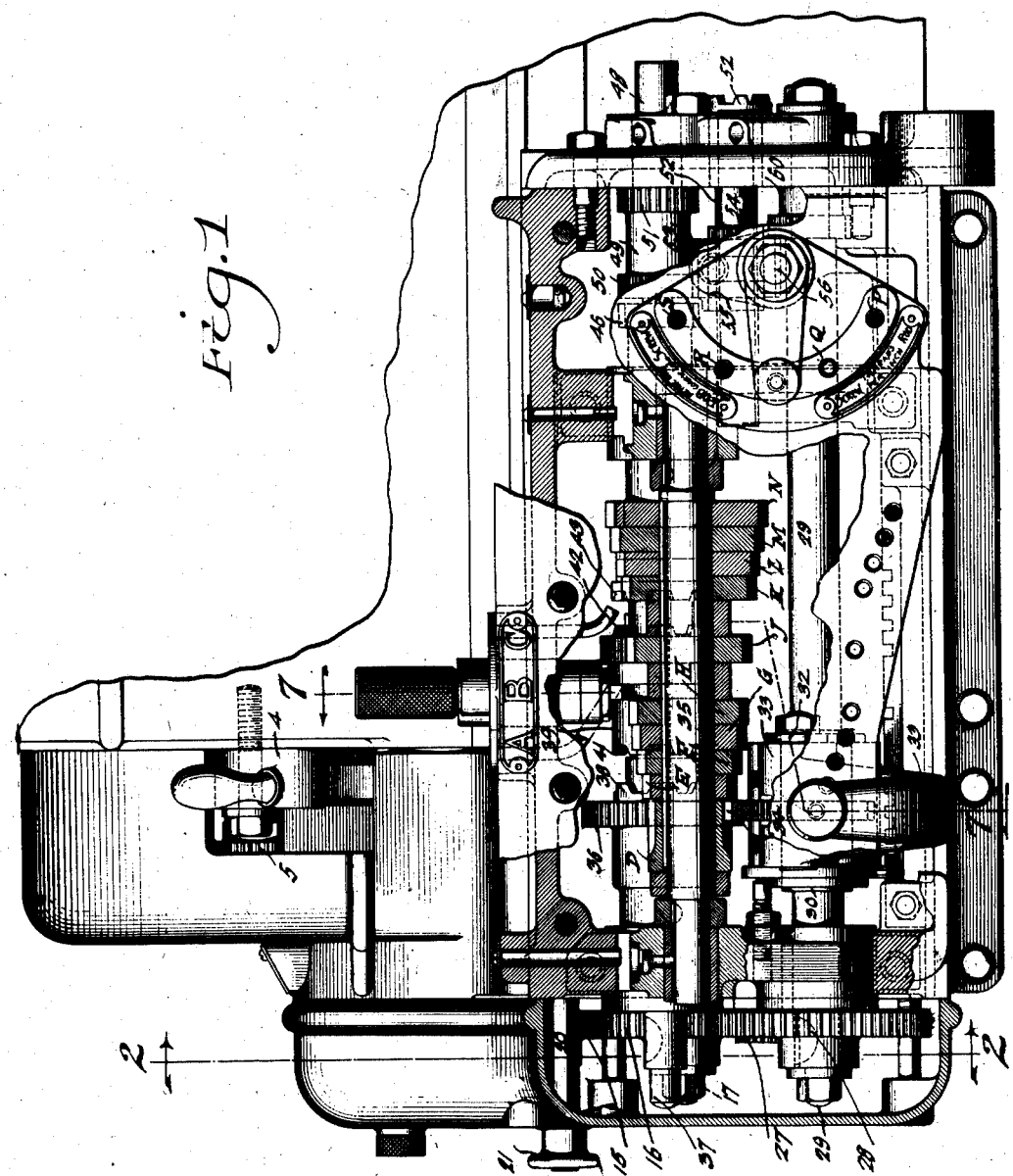
Figure 1 is a side elevation of a portion of a headstock and feed gearing, parts being broken away to show portions of the interior mechanism.

The following described mechanism is adapted to be driven from the headstock of a lathe, only that portion of the headstock mechanism, spindle, and shafts for driving the lead screw and fed rod being herein shown.

The spindle, represented at 1, is suitably journaled in the headstock frame and has fixed at its outer end a gear 2. The gear 2 is in mesh with an intermediate gear 3 carried by a suitable bracket bolted to the headstock frame. Adjacent the gear 3 is a reversing plate 4 suitably pivoted on a bushing carried by the gear box frame and said plate has thereon two pinions 5, 6, either of which may be made to mesh with the intermediate gear 3. The gears 5 and 6 are in constant mesh with each other and gear 5 in mesh with a gear 8 keyed to a shaft 9 which is stepped in bushings carried in the feed box casing. One bushing is projected beyond the frame at each side to form bearings for plates 4 and 12. By this construction power may be transmitted through gear 3 to either gears 5 and 6 and thence to shaft 9. The shaft 9 has keyed at its outer end a change gear 10 which represents one of a series of "translating" gears, means being provided for locking the gears in position on the end of the shaft. Pivoted about the bushing 11 surrounding the shaft 9 is a plate or quadrant 12, swingable about the bushing and suitably non-translatably held thereon. This plate is provided with a slot 13 radially related to the axis of the shaft 9 and also has a second arcuate slot 14 concentric with the same axis. The radial slot 13 has attached slidably thereon a bushing carrying a stub shaft, upon which shaft is rotatably mounted a "translating" change gear 15. The bushing is adjustable in the slot and may therefore be moved therein to accommodate for varying sizes of "translating" gears, which gears after attachment are caused to constantly mesh with the gear 10 or equivalent gear. Traversing the arcuate slot 14 is a clamping bolt engaged with the gear box casing, by which means the quadrant may be adjusted and set at any desired position, this adjustment being for the purpose of accommodating for different size change gears, as for translating from U. S. to metric. As shown in Figure 2, the quadrant is set to mesh the translating gear 15 with a "translating" change gear 16 attached to the outer end of a shaft 17, having keyed thereon a pinion 18 slidable upon the shaft and having an extension to which is fastened a gear 19, the gear and pinion being slidable as a unit upon the shaft 17. Gears 10, 15 and 16 are change gears and additional change gears of proper pitch are provided by which translation from U. S. to metric threads may be had.

Mounted within the gear box casing is a shifter rod or shaft 20 having a suitable manipulating knob 21 at its outer end and having a fork engaging a circumferential groove 22 formed upon a sleeve extension of the gear 19. As shown in Figure 3 the gear 19 is in mesh with the gear 24 formed on a sleeve 25 keyed to a short shaft 26 rotatable in the gear box frame. At the opposite end of this sleeve is formed a gear 23. The outer end of the shaft 26 has formed thereon a pinion 27 in mesh under certain conditions, with a gear 28 keyed at the outer end of a relatively long shaft 29, suitably held in the gear box in parallel relation to all shafts herebefore mentioned (see Figure 9). Keyed to this shaft is a sleeve 30 having thereon a pinion 31, and this sleeve and pinion are slidable as a unit on shaft 29. Upon the sleeve 30 is mounted a bushing 32 upon which in turn is rotatably mounted a lever or tumbler member 33. This member has rotatably mounted thereon, upon a suitable cross shaft, an intermediate gear 34 in constant mesh with the pinion 31. A shaft 35 is rotatably held as shown in the gear casing adjacent the shaft 29 and upon this shaft are keyed a series of gears, respectively D, E, F, G, H, J, K, L, M, N, forming a "cone". The tumbler or lever 33 is provided with a suitable hand operated locking pin engageable with any one of a series of openings in the casing, the number of openings corresponding to the number of gears in the cone. The lever or tumbler may be moved to engage or disengage its intermediate gear 34 with any one of the gears of the "cone" and may be properly locked through engagement of the locking pin in a corresponding opening of the frame. Thus motion may be imparted to the shaft 35 at speeds proportionate to the pitch diameter of the gears. The gear 34 is shown in mesh with the gear D and this gear is constantly meshed with the gear 36, freely rotatable upon a bushing carried by a shaft 37, the axes of shafts 29, 37, being equidistant from the axis of the shaft 26.

The outer end of the shaft 37 is adapted for the reception of the change gear 28, which under certain conditions is removed from the shaft 29 and placed on the shaft 37. It will thus be seen that either shaft 29 or 37 can be driven from pinion 27, correspondingly and alternately causing the cone gears to act as driven or driving members. The gear 36 is provided with a sleeve extension having clutch teeth 38 thereon. Keyed to and slidable upon the shaft 37 is a sleeve 39 having a gear 40 formed thereon and adapted to be moved into mesh with either of gears J, H. This sleeve is provided with clutch teeth 41, 42, respectively opposingly related to the clutch teeth 38 of the sleeve gear 36, and to teeth 43 of a sleeve gear 44 freely rotatable upon the shaft 37 and constantly meshed with gear N. The gear 40 is meshed as shown in Figure 9 with gear J, and is adapted to be meshed also with gear H, when the member 39 is moved to the left to clutch engagement with the teeth 38. When moved to the extreme right the gear 40 is disengaged from the gear J, gear 44 is coupled for rotation with the shaft 37, and the shaft 35 is in transmission connection with shaft 37 through gears N and 44. The clutch 39 is centrally grooved and has engaged within the groove a shoe pivotally supported at the outer end of a lever, the opposite end of which lever is connected to a vertical shaft 45 (see Figure 7). This shaft is held in a suitable bearing bushing of the front casing and has keyed at its upper end a lever having a plunger handle provided with a pin engageable with openings A, B, C, formed in the box or casing, the said openings corresponding to extreme and central positions of the member 39. When the members 39 are in position shown in Figure 9, shaft 37 receives its motion through gear 40, driving gear J, and revolves at the same speed as shaft 35. By sliding the clutch 41 to the left into engagement with the clutch 38, gear 36 is clutched to shaft 37 and the shaft then receives motion through D at half the speed of the shaft 35. When the clutch 42 is thrown from its position in Figure 9 to the extreme right to engage the clutch of the gear 44 the shaft 37 will travel twice the speed of the shaft 35, the power being transmitted through gears 44 and N and to shaft 37. The clutch 39 therefore serves as a speed change device.

On a projected counterturned inner end of the shaft 37 is keyed a pinion 46, and mounted for independent rotation in the frame coaxially with the shaft 37 is a short shaft 47, the outer end of which is coupled with a lead screw 48. This shaft 47 may, however, be continuous with the lead screw, that is, an extension of the same.

The adjacent ends of shafts 37, 47, are slightly spaced apart and keyed to the inner end of the shaft 47 is a sleeve 49, having gears 50, 51, formed thereon at opposite ends, and therefore spaced apart. The sleeve is keyed to one end of the shaft 47 and is freely rotatable upon a bushing held on the counterturned extremity of the shaft 37, the sleeve thus bridging the shafts. The gears 46, 50, are adjacently disposed so that either or both may be engaged by an intermediate gear 53 slidably keyed to a feed rod operating shaft 52, rotatably stepped in the casing adjacent the shaft 47. This gear may also be engaged with gear 51 and is further adapted to lie between gears 50, 51, disengaged from both.

The gear 53 is engaged by a groove in a block, the said block being slidably keyed to a stub shaft 54 also mounted in the casing, parallel with the shaft 52. The block is recessed and engaged within the recess is a pin carried at the outer end of the lever 55 keyed to a shaft 56 which extends outwardly through the front side of the box, and has an operating lever keyed thereto which rides over an arcuate projection at the front side of the box, in which are openings respectively P, Q, R, S, engageable by a locking pin carried in the handle of the lever.

The shaft 52 is adapted to be connected and disconnected to and from the feed rod 57 (see Figure 9), a clutch 58 being provided for this purpose. The clutch is slidably keyed upon a counterturned end of the feed rod and has teeth thereon engageable with corresponding teeth formed upon a terminal flange of the shaft 52. The shaft 52 may, however, be a continuation of the feed rod, and means for coupling and uncoupling either dispensed with or located at some other point.

Upon the shaft 29 is keyed a pinion 60 adapted for engagement by the gear 53 as said gear is moved either to the right to neutral position between the gears 50, 51, or into engagement with the gear 51. The above described mechanism including shafts 37, 29, lead screw and feed rod shafts 47, 52, sliding gear 53, provides means whereby either shafts 37 or 29 are adapted to drive either or both lead screw and feed rod.

In the mechanism here described, the various desired speeds are obtained through the engagement of the individual members of the cone by the gear 34, this gear, as before stated, being slidable along the shaft 29. The drive for the mechanism is obtained from the spindle through spindle gear 2, gears 3, 5 or 6, 8, 10, 15, 16, 19, 24, or 18, 23, 27, and thence through gear 28 to the front of the box, wherein distribution is made to the lead screw and feed rod through the "cone" gearing. The gear 27 is connected with the shafts 29, 37, alternately and selectively by the transferring gear 28 from one of said shafts to the other and in both positions the gear 28 meshes with gear 27. Inasmuch as the axes of the shafts 29 and 37 are equidistant from the axis of the shaft 26 it is obvious that either of the shafts 29, 37, may be driven from the gear 27 by means of change gear 28. With the gear 28 on the shaft 29 the drive is through gears 31, 34 of the tumbler to any one of the "cone" gears selected, thus causing the cone gears to act as driven members. When the gear 28 is transposed to shaft 37 the "cone" gears are converted into driving members, any one of which may be caused to drive the tumbler gears 34, 31, shaft 29 and gear 60. As shown in Figure 9 with the gear 28 on the shaft 29, gear 40 is in mesh with the driven "cone" gear J, the shaft 37 receives motion from the shaft 35 and these two shafts have the same speed of rotation.

In cutting U. S. standard threads the gear 28 is disposed as shown in Figure 9, on shaft 29, the gear 53 would be engaged with gears 46, 50 on shaft 37 and lead screw shaft 48 respectively, and clutch 58 on shaft 57, withdrawn as shown. In cutting metric threads the change gears 10, 15, 16 are replaced by suitable gears to give the translation from U. S. to metric system, and the gear 28 is transferred to shaft 37, as shown in dot-and-dash lines in Figure 9. The drive is communicated through either of gears 36, 40 or 44 on shaft 37, to the gears of the cone and tumbler gear to the shaft 29, and from gear 60 and shaft 29 through slide gear 53, as an intermediate which in this instance is thrown to the extreme right and engaged with gear 51 and lead screw 48, the clutch 58 also being withdrawn as shown. The feed rod may be operated independently of the lead screw from shaft 37 by shifting gear 53 to the extreme left at which time it will be engaged with gear 46, or it may be operated from shaft 29, by shifting gear 53 to a position intermediate gears 50, 51. The gears of the cones thus serve for obtaining the necessary speed range for transmitting the lead screw at an appropriate rate for cutting threads upon either the U. S. standard inch or metric pitch systems. In the one instance the cone of gears are the driving members and for the second the driven, and the gear arrangement shown offers a full number of changes required for both systems. Under the arrangement and number of gears employed sixty changes of speeds are obtainable, equally effective for driving either the lead screw or feed rod, one range of thirty different speeds when the shaft 29 is the driven, in which the cone of gears are regarded as driven members and a range of an additional thirty different speeds when the transmission source is through shaft 37 or the cone of gears as driving members. This materially increases the utility of the tool without added expense and makes the tool equally adaptable for domestic or foreign purposes. The only substitution is in the change gears 10, 15, and 16, for converting the gearing for one measuring system to a second.

The slide gear 53 when engaged with gears 46 and 50 serves as a clutch for connecting shaft 37 and lead screw 48 and in such position acts as a transmitter for the feed rod 57. When the gear 53 is positioned to only mesh with gear 46 it serves as a transmitting element only for the feed rod 57 and when in mesh with gear 51 as a transmitter for both lead screw 41 and feed rod 57 and also permits connecting the feed rod and lead screw with shaft 37 when shaft 29 is a driven member to avoid injury to the gear and provide a single controlling element for making the various changes, simplifying the control.

Having described the invention, we claim:

1. In a device of the class described, a driving shaft, driven shafts equally spaced therefrom, adapting the same to be driven from said driving shaft by a single gear transposable from one shaft to the other, an intermediate shaft having a series of stepped gears thereon, and selective transmission connection between respective driven shafts and individual gears of the series, whereby said driven shafts can be alternately transmittingly connected with said driving shaft, and said gears of said intermediate shaft caused to act alternately as a driving or driven member for the other driven shaft.

2. In a device of the class described, a spindle, a driving shaft, transmission connection between said spindle and shaft, driven shafts equally spaced from said driving shaft to adapt the same to be driven therefrom by a single gear transposable from one driven shaft to the other, an intermediate shaft having a series of stepped gears thereon, selective transmission connection between respective driven shafts and each gear, whereby said driven shafts can be alternately transmittingly connected with said driving shaft, and said intermediate shaft caused to act alternately as a driving and driven member for the other driven shaft.

3. In a device of the class described, a spindle, a driving shaft, transmission connection between said spindle and shaft, driven shafts equally spaced from said driving shaft to adapt the same to be driven therefrom by a single gear transposable from one driven shaft to the other, an intermediate shaft having a series of stepped gears thereon, selective transmission connection between respective driven shafts and said intermediate shaft, a lead shaft coaxial with said first shaft, a rotatable feed rod parallel with said lead shaft and transmission means carried by said feed rod adapted for selectively connecting said coaxial driven and lead shafts, said driven shaft and feed rod, and the second of said driven shafts and lead shafts and feed rod.

4. In a device of the class described, a spindle, a driving shaft, transmission connection between said spindle and shaft, driven shafts equally spaced from said driving shaft, an intermediate shaft having a series of stepped gears thereon, transmission connection between respective driven shafts and gears, and a single gear attachable to either of said driven shafts for transmittingly connecting said shafts with said driving shaft, whereby said intermediate shaft and stepped gears can be caused to alternately act as a driving and driven member.

5. In a device of the class described, a driving shaft, driven shafts equally spaced from said driving shaft, an intermediate shaft having a series of stepped gears thereon, selective transmission connection between respective driven shafts and the gears, and a single gear attachable to either of said driven shafts, for transmittingly connecting said shafts with said driving shaft, whereby said intermediate shaft and gears are alternately adapted as a driving and driven member for selectively transmitting varying rotating speeds to either of said driven shafts.

6. In a device of the class described, first and second shafts, an intermediate shaft transmittingly connected therewith, a third shaft coaxial with said first shaft, a gear upon said first shaft, spaced gears upon said third shaft, one thereof adjacent the gear on said first shaft, a gear upon said second shaft, a fourth shaft, a gear slidably keyed thereon, and adapted to mesh with each gear of said coaxial shafts, simultaneously with said adjacently disposed gears of said coaxial shafts, and simultaneously with the other spaced gear of said third shaft, and the gear of said second shaft, whereby either the first or second shaft is adapted to drive either or both third and fourth shafts.

7. In a device of the class described, first and second shafts each having a terminal gear thereon, an intermediate shaft transmittingly connected with said first and second shafts, a third shaft coaxial with said first shaft, spaced gears upon said third shaft, one adjacent the terminal gear of said first shaft, a rotatable fourth shaft, a gear slidably keyed thereon, and adapted to mesh respectively with each of the gears of said coaxial shafts, simultaneously with adjacently disposed gears of said coaxial shafts, and simultaneously with the terminal gear of said second shaft and the other spaced gear of said third shaft, whereby either the first or second shaft is adapted to drive either or both third and fourth shafts.

8. In a device of the class described, a lead screw shaft, a first driving shaft coaxial therewith, a rotatable feed rod actuating shaft, a second driving shaft having a terminal gear thereon, spaced gears keyed to said lead screw, one of said gears disposed adjacent to said terminal gear of said first driving shaft, a gear keyed to and slidable upon said feed rod adapted to be meshed with individual gears of said coaxial shafts, simultaneously with adjacent gears of said coaxial shafts, and simultaneously with one of the gears of said feed shaft and the terminal gear of the second driving shaft, and power means for alternately rotating said driving shafts.

9. In a device of the class described, a spindle, a driving shaft, driven shafts equally spaced from said driving shaft, an intermediate shaft having a series of stepped gears thereon, selective transmission connection between respective driven shafts and gears, a single gear attachable to either of said driven shafts for transmittingly connecting said shafts with said driving shaft, a lead screw coaxial with one of said driven shafts and having spaced gears thereon, a terminal gear on said first mentioned driven shaft, a terminal gear on said second driven shaft, a rotatable feed rod parallel with said lead screw, having a gear slidably keyed thereon and adapted to be meshed with individual gears of said coaxial shafts, simultaneously with adjacent gears of said coaxial shafts, and simultaneously with one of the gears of said feed shaft and the terminal gear of said second shaft, whereby said first and second shafts may be caused to alternately act as driving and driven members, and whereby either the first or second shaft is adapted to drive either or both said lead screw and feed rod.

10. In a device of the class described, a spindle, a driving shaft, "translating" change gears connecting said spindle and shaft, driven shafts equally spaced from said driving shaft to adapt the same to be driven therefrom by a single gear transposable from one driven shaft to the other, an intermediate shaft having a series of stepped gears thereon, selective transmission connection between respective driven shaft and each gear, whereby said driven shafts can be alternately transmittingly connected with said driving shaft, and said intermediate shaft caused to act alternately as a driving and driven member for the other driven shaft.

11. In a device of the class described, a driving shaft, driven shafts equally spaced therefrom, adapting the same to be driven from said driving shaft by a single gear transposable from one shaft to the other, and an intermediate shaft transmittably connected with said driven shafts, whereby said driven shafts can be alternately transmittingly connected with said driving shaft, and said intermediate shaft caused to act alternately as a driving or driven member for the other driven shaft.

12. A lathe gearing, a pair of parallel shafts, a plurality of gears of different diameter as a unit journaled intermediate of said shafts, a gear for connecting one of said shafts with said plurality of gears, shifting gearing connecting with the second of said shafts and selectively connecting with a respective gear of said plurality of gears, a driven shaft, and transmission means for connecting said driven shaft selectively to either of said pair of shafts, adapting either of said pair of parallel shafts to be utilized as a driver for transmitting the power from one through the plurality of gears to said driven shaft.

In witness whereof, we hereunto subscribe our names.

EDWARD STOCKTON BIRD.
FRANCIS B. COCKBURN.